Nov. 13, 1923.

A. B. SEGUR 1,473,917

EGG CASE FILLER

Filed July 17, 1922   3 Sheets-Sheet 1

Asa B. Segur   INVENTOR,

BY

Albert Scheible   ATTORNEY.

Nov. 13, 1923.                                              1,473,917
                    A. B. SEGUR
                  EGG CASE FILLER
              Filed July 17, 1922       3 Sheets-Sheet 2
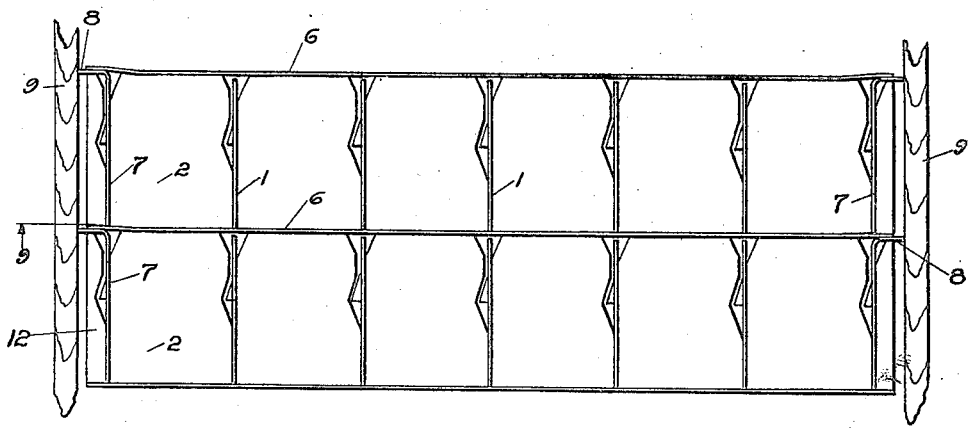
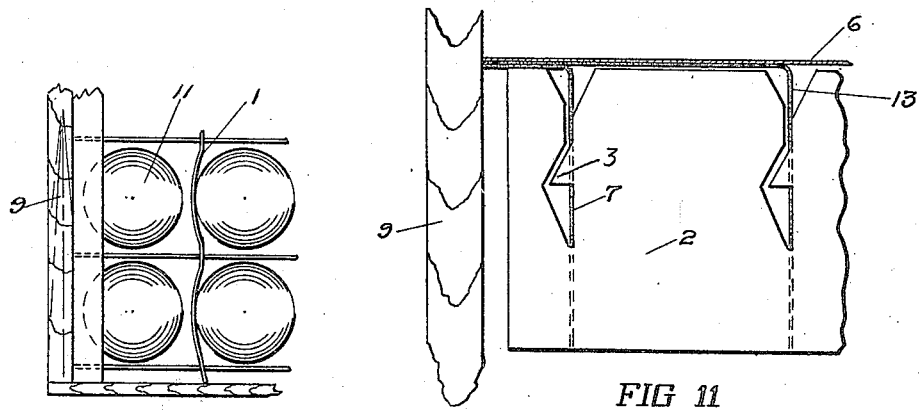
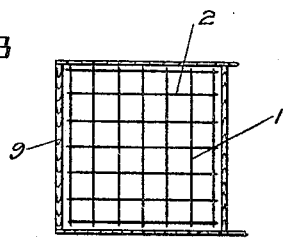
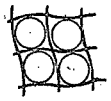
Asa B. Segur INVENTOR,
BY
Albert Scheible, ATTORNEY.

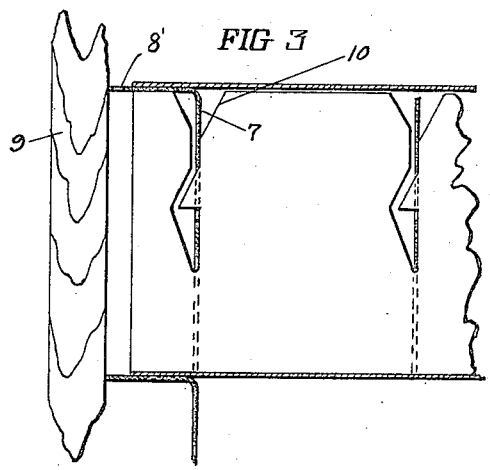
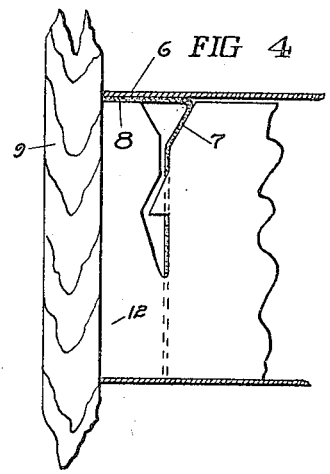
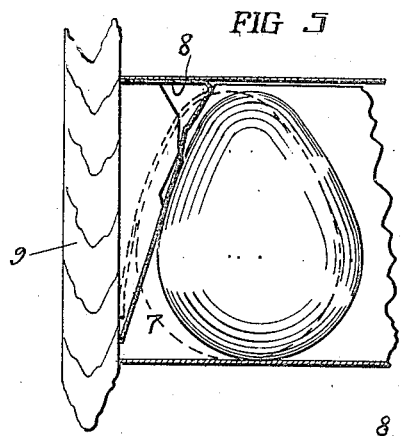
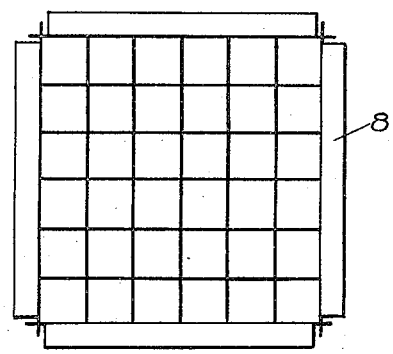
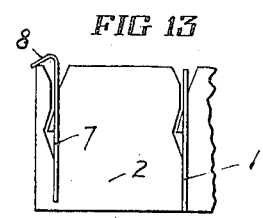

Patented Nov. 13, 1923.

1,473,917

UNITED STATES PATENT OFFICE.

ASA B. SEGUR, OF CHICAGO, ILLINOIS, ASSIGNOR TO TITE-PACK FILLER CO., OF CHICAGO, ILLINOIS, A CORPORATION OF ILLINOIS.

EGG-CASE FILLER.

Application filed July 17, 1922. Serial No. 575,459.

*To all whom it may concern:*

Be it known that I, ASA B. SEGUR, a citizen of the United States, residing at Chicago, in the county of Cook and State of Illinois, have invented certain new and useful Improvements in an Egg-Case Filler; and I do hereby declare the following to be a full, clear, and exact description of the invention, such as will enable others skilled in the art to which it appertains to make and use the same.

My invention relates to cellular containers of the general class of which egg cases are typical, its general object being that of providing a simple and inexpensive tight-pack compartment arrangement which will be unusually effective for preventing breakage of the objects packed in the various cells when the container is subjected to sudden jars. In a more particular aspect, my invention relates to compartmental containers comprising cellular fillers interposed between flats, and aims to equip the fillers with simple and effective means for insuring a tight interfitting of the fillers with the container to prevent a sliding of the fillers within the container, and for preventing the shocks commonly encountered when shipping eggs from damaging the eggs even if these shocks are sufficient to break the interlocking of the relatively transverse filler strips.

In shipping eggs, it has long been customary to pack the same in cellular fillers superposed alternately with horizontal flats in a crate or container section corresponding approximately to the horizontal outside dimensions of the fillers. Both the fillers and the flats are commonly made of a rather cheap grade of cardboard, and in practice the flexibility and resiliency of such cardboard usually distributes the thrust against each egg sufficiently to prevent breakage, hence experience has shown that even cheap strawboard has sufficient flexibility and resiliency to distribute the thrust against each egg under most conditions. That is to say, the contents of the egg shell cooperate with the resiliency of the shell itself in preventing a breakage unless the blow or thrust is localized, so that no egg is likely to be broken by the thrust of a cell wall against the same if this wall can curve freely around a considerable portion of the egg so as to distribute the strain. However, if a cell wall is forced flatwise against a crate wall, the localizing of the thrust is apt to cause breakage and breakage is also apt to occur if the cells are permitted to buckle so that eggs in two adjacent cells impinge against opposite sides of the intervening cell wall, or if the fillers are free to slide.

In practice, the cell walls against which the eggs are most likely to impinge are those extending transversely of the crates, it being customary to load egg cases longitudinally of railway cars so that the shocks due to the switching of cars (or to a bumping of cars when the train is suddenly stopped) are exerted longitudinally of the crates. To prevent such schocks from breaking eggs, it is important that the transverse filler strips should be kept amply spaced from each other to prevent eggs from simultaneously engaging the interposed cell walls, and that the endmost transverse strips should not be allowed to press flatwise against the adjacent crate walls even if the shocks are such as to tear the formations which hold these strips interlocked with the strips extending longitudinally of the crate.

My present invention aims to meet these requirements in an exceedingly simple and inexpensive construction and one which will not demand any special skill on the part of the user or any extra parts (such as end cushions) in addition to the fillers and the flats between which the fillers are interposed. It also aims to provide simple and effective means for insuring a tight packing of the filler in the crate, particularly lengthwise of the latter, in spite of variations in the length of the compartments. For this latter purpose my aim is to provide filler extensions which are sufficiently yieldable before the crate is filled to adjust themselves to the exact length of the crate compartment in which the fillers are used, but which will thereafter be clamped as to resist movements of the filler under ordinary conditions. Furthermore, it aims to arrange these filler extensions so that they will prevent the endmost transverse strips from being flattened against the adjacent crate walls in case the interlock between these endmost strips and the longitudinal filler strips is ruptured, and so that abnormal thrusts when continued after such rupturing has occurred may cause a limited yielding movement of the extensions but will not sever the latter from the endmost transverse strips which carry them. It also aims to provide these novel filler portions with an initial "set" which will hold the extensions in such positions when the fillers are inserted in the crate that the packing of the latter will automatically insure the desired tight-pack effect.

Moreover, my invention aims to accomplish these purposes while employing grades of paper best adapted for the various constituent parts of the filler and while using an easily manufactured construction. Still further and also more detailed objects will appear from the following specification and from the accompanying drawings, in which—

Fig. 2 is an enlarged and fragmentary elevation of two sections of an egg case embodying my invention, taken with the nearer side of the case removed and with the parts in operative position as if the case were packed.

Fig. 3 is a still more enlarged vertical section taken along the line 3—3 in Fig. 1 and also showing the adjacent end wall of the crate.

Fig. 4 is a fragmentary similar view showing how the transverse filler wall adjacent to this end wall of the crate is flexed when the crate is subjected to a severe blow tending to slide it bodily towards the right in Fig. 4.

Fig. 5 is a similar view also showing an egg in a cell and showing what happens when the thrust is sufficient to tear the endmost transverse filler wall out of its interlocking engagement with the longitudinal filler walls.

Figure 1:
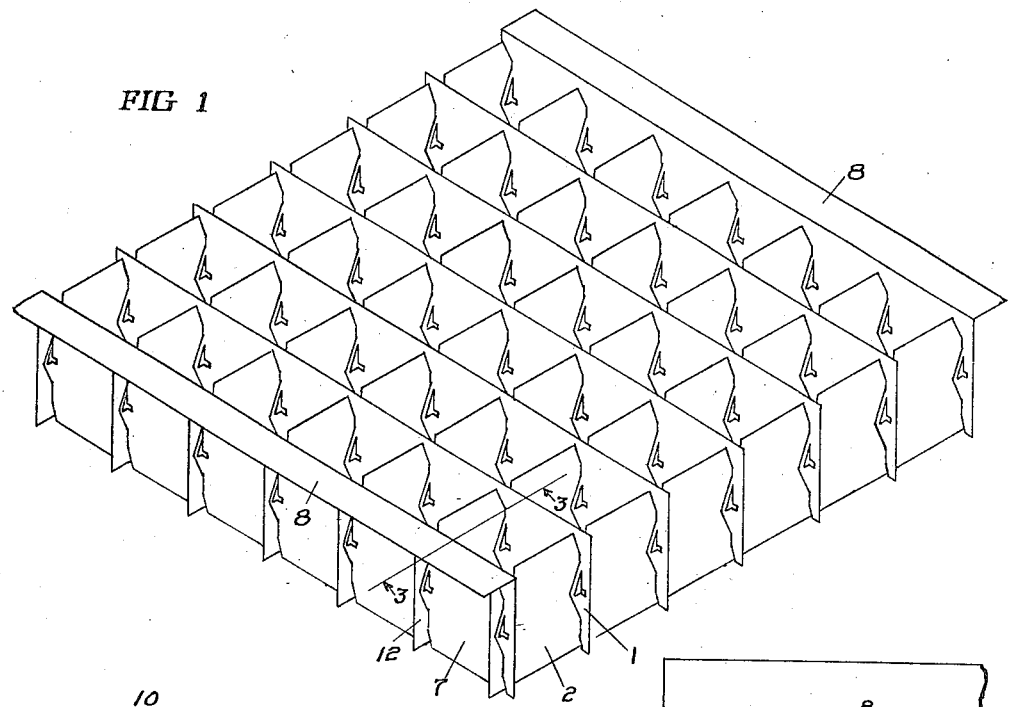
Fig. 1 is an isometric view of a filler section embodying my invention, showing the extensions in the positions in which they are disposed when in use in a packed crate.
Figure 6:
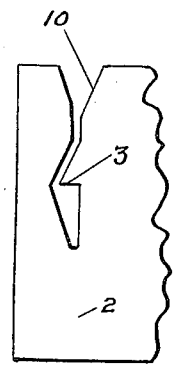
Fig. 6 is an enlarged and fragmentary view of an end of one of the longitudinal filler strips.
Figure 7:
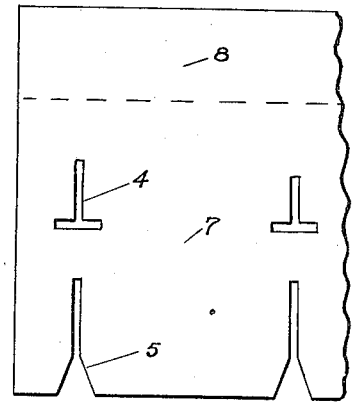

Fig. 7 is an enlarged and fragmentary view of the blank from which one of the endmost transverse filler strips is made, with a dotted line showing the approximate bending line Fig. 8 is a fragmentary plan view of a crate embodying my invention, with the cover, the usual upper packing, and the upper flat removed, and with the eggs shown as having flexed the adjacent transverse filler walls owing to a thrust tending to slide the crate towards the right.

Fig. 9 is a reduced horizontal section of such an egg crate, taken from above one of the intermediate flats to show the relative lengths of the transverse filler strips.

Fig. 10 is a plan view of a filler section having four crate wall engaging webs.

Fig. 11 is a section similar to Fig. 3, showing part of a filler section in which crate wall engaging webs are formed on each of the two filler strips parallel and nearest to the wall.

Fig. 12 is a fragmentary plan view of a filler showing how eggs can be damaged if the filler is free to buckle.

Fig. 13 is a fragmentary side elevation of a filler detached from a crate, showing how the initial "set" in one of the endmost transverse strips raises this and disposes the extension obliquely downward.

In accomplishing the purposes of my invention after the manner of the accompanying drawings, I employ filler sections each of which is made of two relatively intersecting sets of cardboard strips, the intermediate strips 1 which extend transversely of the crate being desirably of a length closely approaching the interior width of the crate or crate section in which the fillers are to be used. The longitudinal filler strips 2 are desirably somewhat shorter than the interior length of the crate or crate section, so as to aid in allowing for variations in this length as hereafter described. The two sets of strips are relatively interlocked in the usual manner, as for example by having the transverse strips notched upwardly from their lower edges to partly straddle the longitudinal strips and by having the longitudinal strips equipped with tongues 3 entering vertical slots 4 in the transverse strips, the transverse strips having downwardly open notches 5 to permit the said straddling. Interposed between the successive fillers are horizontal flats 6, which flats can also be shorter than the interior length of the crate or crate section and desirably are no longer than the longitudinal filler strips.

With the parts thus arranged, it will be evident from Fig. 2 that if the transverse filler strips 1 were all of the usual construction, the resulting filler section could slide freely back and forth within the crate. To resist such sliding, I desirably make each endmost transverse filler strip 7 from a paper strip considerably wider than that used in making the other transverse strips 1, and bend this wider strip to afford an extension web 8 which is folded over the adjacent tips of the longitudinal filler strips towards the adjacent end wall 9 of the crate and into edgewise engagement with the latter. To secure this engagement with the crate end, the extension web 8 projects beyond the adjacent tips of the longitudinal strips, so that the extreme tips of the two extensions 8 on each filler section are spaced from each other by a distance corresponding to the interior length of the crate or crate section. In practice, this interior length will vary slightly, and to allow for such a variation, I make the said extensions of such width that the normal distance between their oppositely directed crate wall engaging edges is greater than the corresponding interior crate dimension. I provide each of the longitudinal filler strips adjacent to its juncture with the endmost transverse filler strips with notches 10 formed for permitting the vertical portion of the endmost filler strip 7 to be flexed away from the adjacent crate end 9 to a limited extent. I also desirably make these endmost transverse strips of a tougher and more resilient grade of paper than the strawboard which is ordinarily employed for fillers and which is ample in quality for the other transverse strips of my filler. Furthermore, I do not bend the blank from which each endmost filler strip is formed sharply along the dotted line shown in Fig. 7. but form a quite rounding bend so as to permit this filler strip to be flexed after the manner shown in Fig. 4 without danger of cracking or tearing the same.

When a case as thus constructed is filled with eggs and is subjected to a sudden longitudinal thrust, such as that due to the switching of a car in which the eggs are being shipped, the inertia of the eggs will tend to hold the eggs stationary while the thrust upon the car will tend to move car and case. Consequently, the eggs will be engaged with considerable force by the transverse filler strips on that side of the egg from which the thrust is imparted. In the intermediate transverse strips the resulting forcible engagement will do no harm if these transverse strips are kept suitably spaced from each other, as each of these strips can readily be bowed after the manner shown in Fig 8 by such a thrust, thereby affording an ample cushioning action for preventing a breakage of the eggs.

But, if the filler as a whole were free to slide and if the thrust should be somewhat from one side, the filler might buckle (as shown for example in Fig. 12) so as to decrease this spacing and prevent the cell wall interposed between two eggs in the same longitudinal row from bowing adequately around each of these eggs. To prevent breakage from such a cause, I not only pack the case with the usual excelsior padding at the top and bottom of the crate, but also desirably make the longitudinal filler strips of a stiffer board so that they will resist end thrusts without bending or buckling. Furthermore, I desirably make the longitudinal filler strips somewhat taller than the transverse strips, as shown in Figs. 2 and 3, so that these longitudinal strips will be gripped edgewise between the flats when the case is packed.

However, the end row containing the eggs 11 adjacent to the end 9 of the casing which is being forcibly moved in a direction towards these eggs is more liable to damage, particularly as a severe thrust may bend the adjacent tips 12 of the longitudinal filler strips to one side or the other, thereby permitting the adjacent endmost transverse filler strip 7 to approach the end wall 9 of the crate to such an extent that a corresponding flexing of this filler strip 7 would cause the same to impinge flatwise against the end wall, whereby the resulting localized impact against this inflexible wall is apt to break the eggs.

As for the endmost transverse strips, it will be evident that if these were not equipped with the extension webs 8, a severe thrust on each of these strips 7 tending to move the same toward the adjacent crate wall might tear the interlock between that strip and the longitudinal filler strips. This would permit the said strip to bear flatwise against the adjacent crate end and the resulting localizing of the thrust against the end row of eggs would be apt to break the latter. However, the extension 8 on each of these strips 7 keeps the upper edge of the strip spaced from the adjacent crate wall, so that a severing of the interlock will only tilt the lower edge of this strip 7 against the crate wall as shown in Fig. 5, thereby still leaving this strip free to bow around part of each contiguous egg (as shown in dotted lines in Figs. 5 and 8) so as to distribute the pressure and avoid breakage. Or, if the thrust on the edge of the extension 8 is unduly severe while the interlocking with the longitudinal strips remains unsevered, the rolled juncture of this extension with the strip 7 carrying the same may permit this web to move after the manner shown in Fig. 4 so as to afford some yielding without tearing the extension off the strip. That is to say, the tough stock and the rolling of the bend cooperate in permitting a possible resilient action, although with a proper packing of the case this may only be needed to the extent of adjusting for variations in the length of the crate compartments.

If the extensions 8 were free to bend upwardly when being inserted, they might tend to crowd in between the crate end and the strip ends of the superposed filler, and the extensions on the uppermost filler might tend to crowd in between the crate walls and the top of the crate, thus spoiling the rigidity which affords the desired tight-pack effect. To prevent this, I initially form the endmost transverse strips with an acute-angled cross-section which causes each extension to be directed downwardly before the filler is inserted in the crate, after the manner shown in Fig. 13, or in other words gives the juncture a permanent "set" to this effect. Then when the filler is inserted in the crate, the packing of the superposed parts on it presses the endmost transverse strips downward and insures the horizontal positions of the extensions in which the latter are most effective. To allow for the initial lifting of these endmost strips, the slots 4 in these strips with which the tongues 3 on the longitudinal strips interlock are made correspondingly taller, as shown in Figs. 7 and 11.

However, while I have illustrated my invention in a type of filler embodying a conventional type of interlocking formation and have described the same as having the crate and engaging webs on the endmost transverse strips, I do not wish to be limited to these or other details of the construction and arrangement thus disclosed, it being obvious that the same might be varied in many ways without departing either from the spirit of my invention or from the appended claims. For example, Fig. 10 is a plan view of a filler in which horizontal crate-wall-engaging webs are provided not only on the endmost transverse filler strips but also on the two sidemost longitudinal strips, thereby presenting a tight packing action in four directions. While such a four-way tight packing is not needed for railroad practice as customary in this country where the egg cases are regularly placed in a certain position in the cars, such a four-directioned web arrangement is desirable for marine shipments where the direction of the thrusts cannot be predetermined as they may be due either to a lateral rolling of the ship or to an endwise surging of the same.

Furthermore, I do not wish to be limited to placing the wall-engaging and tight-pack affording webs on the outer strips, or on these alone, as the action would obviously be similar if such webs were formed from other strips, although more material would then be required. For example Fig. 11 shows a part of a filler in which the wall engaging action is secured partly by a web 8 on the endmost transverse filler and partly by a corresponding web 13 on the next transverse filler, so that the two webs are both overlapped by part of the superposed flat. The flatwise clamping of this flat on the extension web then affords resistance which cooperates with the stiffness of the web-equipped filler strips in holding this extension continuously in engagement with the adjacent crate wall, this clamping being effective in either case for maintaining the desired tight packing.

In either case, the yielding action which I secure in the endmost transverse strips is employed primarily to adjust the effective length of the filler to the variable interior length of the corresponding crate compartment, which it does automatically when the filler is inserted and which it will do even if this compartment were unusually short as in Fig. 4. Then when the crate is packed, the flats are clamped down tightly upon the extension webs to hold them against movement under ordinary conditions, while the engagement of the flats with the intermediate transverse strips prevents the filler as a whole from sliding even if the crate is severely bumped.

I claim as my invention:—

1. A compartmental filler for a container having rigidly spaced side and end walls, including cells formed by the interlocking of transverse partitions extending substantially from one side wall to the other and longitudinal partitions terminating short of both end walls, two of the transverse partitions being extended above the longitudinal partitions and bent respectively toward the adjacent end walls of the container to afford extensions, each of which extensions projects beyond the longitudinal partitions and into direct, continuous and edgewise engagement with the adjacent end wall of the container; the two transverse partitions equipped with the said extensions being interlocked at a distance from their tops with the longitudinal partitions to space the lower portions of the said two transverse partitions apart, the said interlocking connection being arranged to permit a flexing of the said two transverse partitions as to vary the distance between the container-wall-engaging edges of the extensions, the said distance being greater before the filler is inserted in the container than the distance between the container walls engaged by the said edges when the filler is inserted.

2. A compartmental filler for a container, as per claim 1, in which the partitions carrying the said extensions have greater resiliency than the other partitions parallel thereto, whereby the said more resilient partitions will allow movement of the extensions thereon inwardly of the filler and will hold the extensions respectively in firm engagement with the adjacent container walls.

3. A compartmental filler for a container, as per claim 1, in which the longitudinal partitions have greater stiffness than the transverse partitions so as to resist the thrust imparted thereto by engagement of the tips of the longitudinal partitions with an adjacent container wall when the extension overhanging the said tips adjacent to said wall has been moved sufficiently to permit such engagement, and to transmit such thrust to the transverse partitions carrying the other extension.

4. A compartmental filler for a container having rigid walls, comprising two relatively transverse and interlocked sets of strips, each of the two endmost strips of one set having an extension thereon overhanging and extending beyond the adjacent tips of the strips of the other set into direct and continuous edgewise engagement with one of the container walls, the distance between the container-wall-engaging edges of the two extensions being normally greater than the corresponding interior dimension of the container, the interlocking connection between the two sets of strips being arranged to permit a flexing of the said two endmost strips so as to vary the distance between the free edges of the said extensions, each of the said two endmost strips being connected to the extension thereon by a rounded edge permitting a flexing of the strip adjoined thereto without rupturing the said connection, so as to permit the fitting of the filler to containers of varying interior dimensions.

5. A compartmental container filler as per claim 4, in which each of the filler members comprising one of the said endmost strips and the extension thereon is formed with a "set" affording an acute-angled vertical section before the filler is assembled, thereby causing each such extension to be downwardly inclined from the upper edge of the strip carrying the same and causing the extension to first engage the strips transverse thereto adjacent to the tips of the latter whereby the said downward inclination tends to hold the free edge of the extension below the tops of the strips transverse thereto so as to prevent this extension from overlapping the upper adjacent edge of the container wall.

6. A tight-packing filler for a container having rigidly spaced side and end walls, comprising a plurality of relatively superposed fillers separated by flat spacer members; each filler comprising vertically walled cells formed by the interlocking of partitions extending transversely of the container from one side wall to the other and other partitions extending longitudinally of the container and terminating short of both end walls, one of the transverse vertical partitions adjacent to each end of the filler being extended upwardly and bent upon itself to afford an extension resting upon the longitudinal partitions and projecting beyond the tips of the latter into edgewise engagement with the adjacent end container wall, each such extension being adjoined to the partition connected thereto by a rounded edge and at an acute angle and the said partition being transversely flexible, the interlocking connections between the longitudinally extending partitions and the two transverse partitions equipped with the said extensions being arranged to permit a flexing of the said two partitions so as to vary the distance between the container-wall-engaging edges of the said extension, each spacer member being free of interlock with the fillers spaced thereby and resting upon the two extensions of the next lower filler, the said resting of the spacer cooperating with the said flexibility of the extension-equipped partitions in causing the packing of the spacer against the said extensions to flex the said two partitions to clamp the extensions in their container-wall-engaging disposition.

7. A compartmental filler for a container having rigid walls, comprising two relatively transverse and interlocked sets of strips, each of the strips of one set being of flexible material and having an extension thereon overhanging and extending beyond the adjacent tips of the strips of the other set so as to present its free edge for engagement with one of the container walls, the interlocking connection between the two sets of strips being arranged to permit a flexing of the said two endmost strips so as to vary the distance between the free edges of the said extensions, each of the said two strips being connected to the extension thereon by a rounded edge permitting a flexing of the strip adjoined thereto without rupturing the said connection, so as to permit the fitting of the filler to containers of varying interior dimensions.

8. A tight-packing filler for a container having rigidly spaced side and end walls, comprising a plurality of relatively superposed fillers separated by flat spacer members, each filler comprising vertically walled cells formed by the interlocking of partitions extending transversely of the container from one side wall to the other and other partitions extending longitudinally of the container and terminating short of both end walls, one of the transverse vertical partitions adjacent to each end of the filler being extended upwardly and bent upon itself to afford an extension resting upon the longitudinal partitions and projecting beyond the tips of the latter to present a free edge towards the adjacent end container wall, the transverse partition to which each of the said extensions is adjoined being transversely flexible, the interlocking connections between the longitudinally extending partitions and the two transverse partitions equipped with the said extensions so as to vary the distance between the free edges of the said two extensions, each spacer member being free of interlock with the fillers spaced thereby and resting upon the two extensions of the next lower filler, the said resting of the spacer cooperating with the said flexibility of the extension-equipped partitions in causing the packing of the spacer against the said extensions to flex the said two partitions and to clamp the extensions against the adjacent longitudinal partitions with each extension projecting beyond the adjacent ends of the longitudinal partitions.

Signed at Chicago, Illinois, July 14th, 1922.

ASA B. SEGUR.